(12) United States Patent
Yoshida (10) Patent No.: US 6,993,965 B2
(45) Date of Patent: Feb. 7, 2006

(54) HORIZONTAL AXIS WIND TURBINE AND METHOD FOR MEASURING UPFLOW ANGLE

(75) Inventor: Shigeo Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/914,381

(22) Filed: Aug. 9, 2004

(65) Prior Publication Data

US 2005/0034516 A1    Feb. 17, 2005

(30) Foreign Application Priority Data

Aug. 11, 2003    (JP) .............................. 2003-291540

(51) Int. Cl.
*G01W 1/00*    (2006.01)
(52) U.S. Cl. ................................. 73/170.01
(58) Field of Classification Search . 73/170.01–170.15
See application file for complete search history.

(56) References Cited

U.S. PATENT DOCUMENTS 5,639,963 A * 6/1997 Sustare, Jr. .............. 73/170.08
5,646,343 A   7/1997 Pritchard
6,531,967 B2 * 3/2003 Djorup ....................... 340/949

FOREIGN PATENT DOCUMENTS

EP    1 460 266 A2    9/2004

OTHER PUBLICATIONS

Kaijo Corp., "Measurement and Control System Business-Atmospheric Apparatus," 1 page; Kaijo Corp. http://www-.kaijosonic.co.jp/products/kisyo/kisyo_01_e.html.
Folkerts, Luuk et al., "Offshore Wake Measurements Using a Sodar," EWEA Special Topic Conference on Offshore Wind Energy, Dec. 10, 2001. pp. 1-3, XP001127011.
Mellinghoff, Harald et al., "SODAR Measurements in Complex Terrain," DEWI Magazine, Aug. 2000, pp. 16-25, No. 17, Deutsches Windenergie Institut, Wilhelmshaven, Germany, XP001116121.

* cited by examiner

*Primary Examiner*—Edward Lefkowitz
*Assistant Examiner*—Jermaine Jenkins
(74) *Attorney, Agent, or Firm*—Smith, Gambrell & Russell

(57) ABSTRACT

A horizontal axis wind turbine includes: a horizontal plate disposed on upwind side of a rotational central portion of a rotor; a first anemometer disposed at an upper position of upwind side of the horizontal plate; a second anemometer disposed at a lower position of the horizontal plate; and an upflow angle measuring section for measuring an upflow angle based on a wind speed difference or a wind speed ratio obtained from wind speeds measured by the first anemometer and the second anemometer.

14 Claims, 4 Drawing Sheets

HORIZONTAL AXIS WIND TURBINE AND METHOD FOR MEASURING UPFLOW ANGLE

BACKGROUND OF THE INVENTION

1. Field of the Invention

The present invention relates to a horizontal axis wind turbine and a method for measuring an upflow angle.

2. Description of Related Art

In recent years, horizontal axis wind turbines have been in practical use in order to gain electric power from natural wind. The performance of the horizontal axis wind turbines is shown by a power curve representing relationship between the wind speed at hub (the wind speed at the rotational central portion of a rotor of a horizontal axis wind turbine) and power (production of electricity) in general. The production of electricity leading directly to profitability is predicted based on the power curve and the wind speed at hub estimated by simulation or observed in advance.

Wind-generated electricity systems are often installed in complex topography. In such topography, the wind speed varies with not only the height from ground but also the horizontal position, and in addition, an upflow wind is often generated. The power generation and structure damage are affected by not only horizontal component of the wind but also vertical. Therefore it is meaningful to measure 3-D wind speed with consideration of "upflow angle" for improvement of predictability of the production of electricity.

3-D ultrasonic anemometers and Pitot tubes are proposed as earlier developments for measuring 3-D wind speed with consideration of a "upflow angle". (For example, see Kaijo Corp. "measurement and control system business—atmospheric apparatus" [online] 1997, Kaijo Corp.)

The above-described 3-D ultrasonic anemometers, however, have a problem that it is expensive and large. An anemometer for measuring the wind speed at hub of a horizontal axis wind turbine requires durability to endure even in a relative harsh environment for long periods without maintenance, whereas 3-D ultrasonic anemometers and Pitot tubes are not produced on an assumption of such an operating environment. Therefore they have reservations about durability and lack reliability.

SUMMARY OF THE INVENTION

An object of the present invention is to improve predictability of the production of electricity by achieving measurement of the "upflow angle" of the wind against a rotor of a horizontal axis wind turbine at low cost and with high reliability.

In order to solve the above-described problem, in accordance with the first aspect of the present invention, a horizontal axis wind turbine comprising:

a horizontal plate disposed on upwind side of a rotational central portion of a rotor;

a first anemometer disposed at an upper position of upwind side of the horizontal plate;

a second anemometer disposed at a lower position of the horizontal plate; and an upflow angle measuring section for measuring an upflow angle based on a wind speed difference or a wind speed ratio obtained from wind speeds measured by the first anemometer and the second anemometer.

According to the first aspect of the present invention, the horizontal plate is disposed on the upwind side of the rotational central portion (hub) of the rotor. The first anemometer is disposed at an upper position of the upwind side of the horizontal plate, where the horizontal plate has a less effect. The second anemometer is disposed at a lower position of the horizontal plate. Therefore when an upflow wind (a wind at the plus upflow angle) blows against the hub, the wind speed measured by the second anemometer becomes higher than the wind speed measured by the first anemometer due to the effect of the horizontal plate. Whereas, when a downflow wind (a wind at the minus upflow angle) blows against the hub, the wind speed measured by the second anemometer becomes lower than the wind speed measured by the first anemometer due to the effect of the horizontal plate. That is, a constant relationship exists between the difference (or the ratio) between the wind speed measured by the first anemometer and the wind speed measured by the second anemometer and the upflow angle.

It is possible to measure the upflow angle by means of an upflow angle measuring section based on the difference (or the ratio) obtained from the wind speeds measured by the first anemometer and the second anemometer by use of the relationship. Consequently the upflow angle can be continuously measured at low cost with high reliability without using an expensive device. Furthermore because of adoption of two anemometers, when either anemometer breaks down, the other anemometer makes measurement of wind speed for control possible. In addition to ensuring redundancy of an anemometer and shortening the stopping time of a wind turbine, a loss of power production in the down time can be reduced.

In the wind turbine, the upflow angle measuring section may comprise:

a wind speed difference calculating unit for calculating the wind speed difference from the wind speeds measured by the first anemometer and the second anemometer;

a recording unit for recording wind speed difference correlation data showing relationship between the wind speed difference and the upflow angle; and an upflow angle estimating unit for estimating the upflow angle by using the wind speed difference calculated by the wind speed difference calculating unit and the wind speed difference correlation data recorded in the recording unit.

According to the above-described invention, it is possible to calculate the wind speed difference based on the wind speeds measured by the first anemometer and the second anemometer, and estimate (measure) the upflow angle by using the calculated wind speed difference and the wind speed difference correlation data showing the relationship between the wind speed difference and the upflow angle.

In the wind turbine, the upflow angle measuring section may comprise:

a wind speed ratio calculating unit for calculating the wind speed ratio from the wind speeds measured by the first anemometer and the second anemometer;

a recording unit for recording wind speed ratio correlation data showing relationship between the wind speed ratio and the upflow angle; and an upflow angle estimating unit for estimating the upflow angle by using the wind speed ratio calculated by the wind speed ratio calculating unit and the wind speed ratio correlation data recorded in the recording unit.

According to the above-described invention, it is possible to calculate the wind speed ratio based on the wind speeds measured by the first anemometer and the second anemometer, and estimate (measure) the upflow angle by using the calculated wind speed ratio and the wind speed ratio correlation data showing the relationship between the wind speed ratio and the upflow angle.

In accordance with the second aspect of the present invention, a method for measuring an upflow angle with the wind turbine comprises:

measuring a first wind speed measured by the first anemometer;

measuring a second wind speed measured by the second anemometer;

calculating the wind speed difference from the first wind speed measured in the measuring of the first wind speed and the second wind speed measured in the measuring of the second wind speed; and estimating the upflow angle by using the data showing relationship between the wind speed difference and the upflow angle and the wind speed difference calculated in the calculating.

In accordance with the third aspect of the present invention, a method for measuring an upflow angle with the wind turbine comprises:

measuring a first wind speed measured by the first anemometer;

measuring a second wind speed measured by the second anemometer;

calculating the wind speed ratio from the first wind speed measured in the measuring of the first wind speed and the second wind speed measured in the measuring of the second wind speed; and estimating the upflow angle by using the data showing relationship between the wind speed ratio and the upflow angle and the wind speed ratio calculated in the calculating.

In accordance with the fourth aspect of the present invention, a horizontal axis wind turbine comprises:

a parting member disposed in a horizontal position;

a first anemometer disposed on upwind side of the parting member;

a second anemometer disposed at a lower position of the parting member; and an upflow angle measuring section for measuring an upflow angle based on wind speeds measured by the first anemometer and the second anemometer, wherein one of the two anemometers is located above level of the parting member and the other is located below the level of the parting member.

In the wind turbine, the parting member may be a plate-like member.

In the wind turbine, the upflow angle measuring section measures an upflow angle based on a difference or a ratio between wind speeds measured by the first anemometer and the second anemometer.

In the wind turbine, the upflow angle measuring section may comprise;

a wind speed difference calculating unit for calculating a wind speed difference from the wind speeds measured by the first anemometer and the second anemometer;

a recording unit for recording wind speed difference correlation data showing relationship between the wind speed difference and the upflow angle; and an upflow angle estimating unit for estimating the upflow angle by using the wind speed difference calculated by the wind speed difference calculating unit and the wind speed difference correlation data recorded in the recording unit.

In the wind turbine, the upflow angle measuring section may comprise:

a wind speed ratio calculating unit for calculating a wind speed ratio from the wind speeds measured by the first anemometer and the second anemometer;

a recording unit for recording wind speed ratio correlation data showing relationship between the wind speed ratio and the upflow angle; and an upflow angle estimating unit for estimating the upflow angle by using the wind speed ratio calculated by the wind speed ratio calculating unit and the wind speed ratio correlation data recorded in the recording unit.

In accordance with the fifth aspect of the present invention, an upflow angle measuring method using the wind turbine comprises:

measuring a first wind speed measured by the first anemometer;

measuring a second wind speed measured by the second anemometer;

calculating the wind speed difference from the first wind speed measured in the measuring of the first wind speed and the second wind speed measured in the measuring of the second wind speed; and estimating the upflow angle by using the data showing relationship between the wind speed difference and the upflow angle and the wind speed difference calculated in the calculating.

In accordance with the sixth aspect of the present invention, an upflow angle measuring method using the wind turbine comprises:

measuring a first wind speed measured by the first anemometer;

measuring a second wind speed measured by the second anemometer;

calculating the wind speed ratio from the first wind speed measured in the measuring of the first wind speed and the second wind speed measured in the measuring of the second wind speed; and estimating the upflow angle by using the data showing relationship between the wind speed ratio and the upflow angle and the wind speed ratio calculated in the calculating.

According to the present invention, because of providing the two anemometers (the first anemometer and the second anemometer) disposed above and below the level of the horizontal plate, the upflow angle can be measured at low cost with high reliability based on the wind speed difference or the wind speed ratio obtained from the wind speeds measured by the two anemometers, and thus it is possible to contribute to improvement of predictability of the production of electricity.

BRIEF DESCRIPTION OF THE DRAWINGS

The present invention will become more fully understood from the detailed description given hereinbelow and the accompanying drawings which are given by the way of illustration only, and thus are not intended as a definition of the limits of the present invention, and wherein.

DETAILED DESCRIPTION OF THE PREFERED EMBODIMENTS

Hereinbelow an embodiment of the present invention will be described in detail with drawings. In the present embodiment, a downwind horizontal axis wind turbine 1 shown in FIG. 1 is adopted as an example of a horizontal axis wind turbine.

The configuration of the horizontal axis wind turbine according to the present embodiment will be described. The horizontal axis wind turbine 1 comprises, as shown in FIGS. 1 and 2, a tower 2, a nacelle 3 attached on the top of the tower 2, a main shaft (not shown) extending in a substantially horizontal direction and pivotally supported on the nacelle 3, a rotor 4 attached on the main shaft, a boom 5 set up so as to protrude at a predetermined distance on the upwind side of the nacelle 3, a first anemometer 6 attached to the upper side of the peripheral part of the upwind side of the boom 5 in such a way that its rotating shaft is in a substantially vertical direction, a horizontal plate 7 set up on a substantially central portion in the longitudinal direction and on a substantially central portion in the width direction of the boom 5, a second anemometer 8 attached to the portion below the horizontal plate 7 of the boom 5 in such a way that its rotating shaft is in a substantially vertical direction, and a control device 100 for integrating and controlling the whole of the horizontal axis wind turbine.

Figure 1:
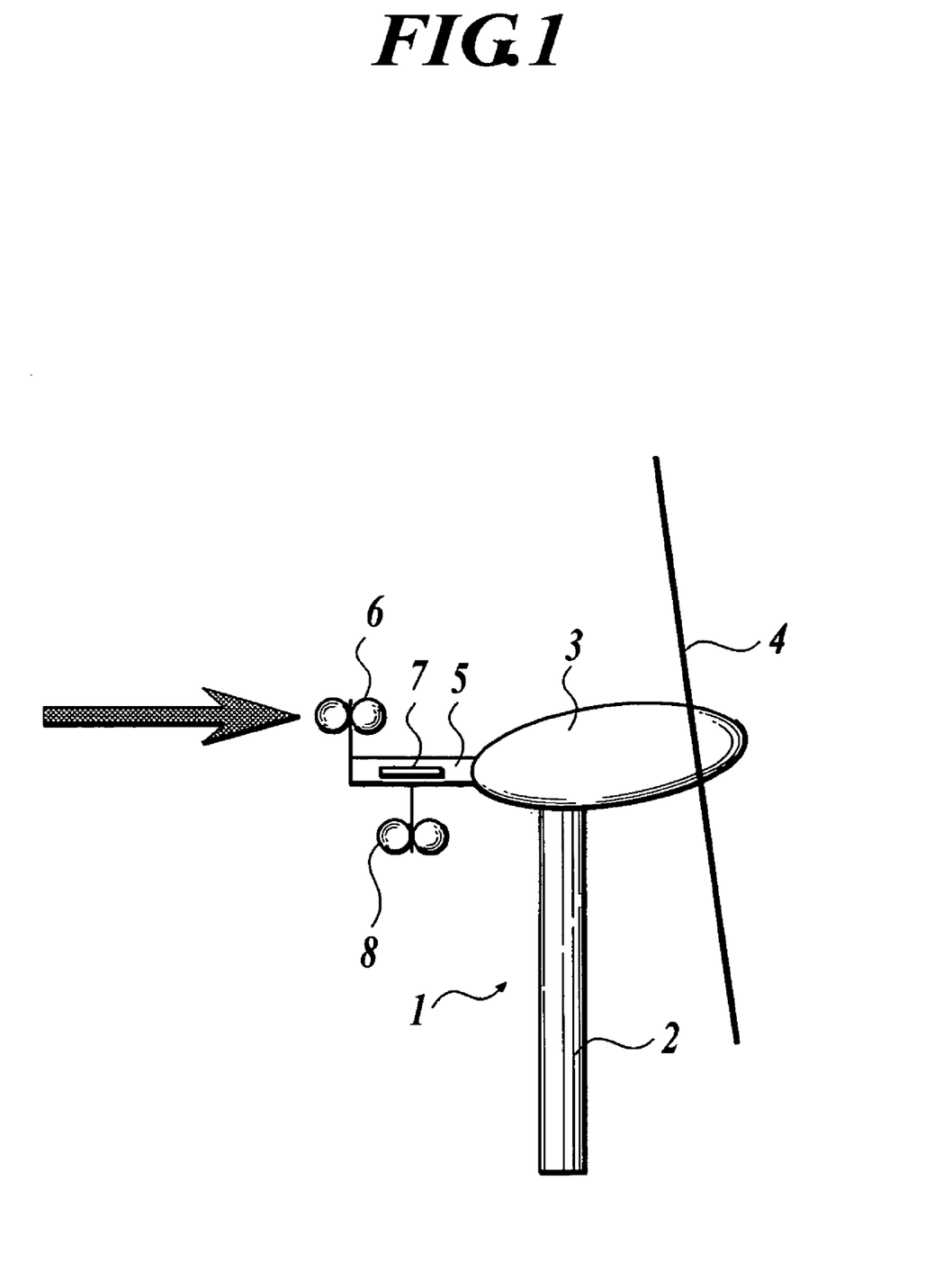
FIG. 1 is a schematic diagram showing a horizontal axis wind turbine according to an embodiment of the present invention.
Figure 2:
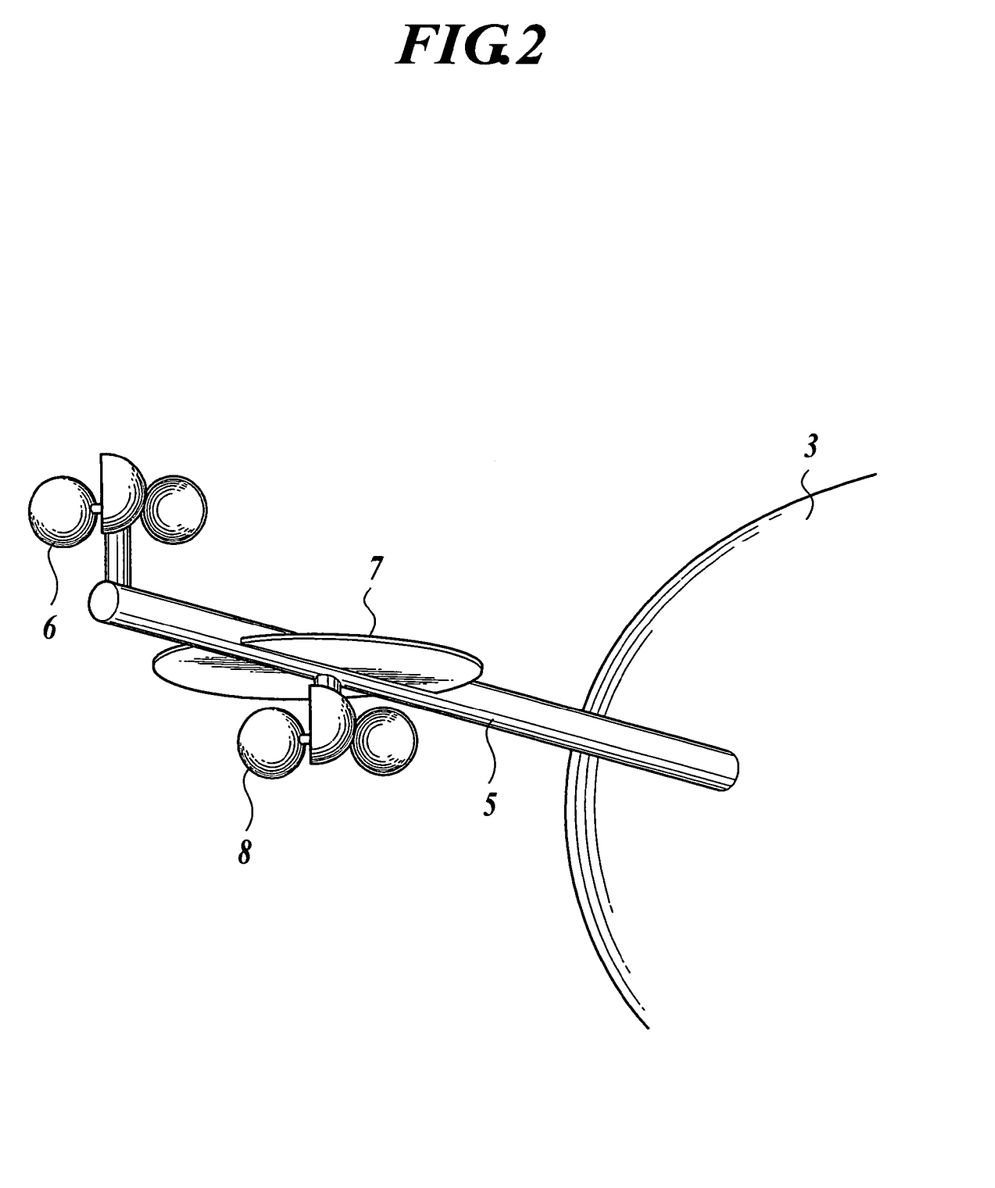
FIG. 2 is a perspective illustration showing the configuration of the major portion of the horizontal axis wind turbine shown in FIG. 1.

The boom 5 is an elongated member for supporting the first anemometer 6, the horizontal plate 7, and the second anemometer 8 to the upwind side of the nacelle 3 (see FIGS. 1 and 2). The length and the diameter of boom 5 are determined properly depending on the size and the configuration of the nacelle 3 of the horizontal axis wind turbine 1 and the weights of the first anemometer 6 and the second anemometer 8, in addition to them, it is possible to consider the natural frequency of the boom to determine the length and the diameter of the boom. The boom 5 may be made of metallic material, synthetic resin, or the like.

The first anemometer 6 and the second anemometer 8 are rotation anemometers wherein a plurality of cups catch the wind blowing against the rotational central portion of the rotor 4 of the horizontal axis wind turbine 1 and a wind speed is measured from the speed of the rotation. The type of the first anemometer 6 and the second anemometer 8 is not limited in particular. Therefore the type used conventionally (for example, the type of the anemometer manufactured by Vaisala or by Thies) may be adopted.

The horizontal plate 7 is a member to make a difference between a value of the wind speed measured by the first anemometer 6 and a value of the wind speed measured by the second anemometer 8 when an upflow wind (or a downflow wind) blows. The thickness and the size are determined properly depending on the length and the diameter of the boom 5, the sizes of the second anemometer 8 and nacelle 3, and the like. The horizontal plate 7 may be made of metallic material, synthetic resin or the like.

The control device 100 performs a calculating process for calculating a difference (hereinafter, referred to as "wind speed difference") or a ratio (hereinafter, referred to as "wind speed ratio") between the wind speed measured by the first anemometer 6 and the wind speed measured by the second anemometer 8, an upflow angle estimating process for estimating the upflow angle by using the wind speed difference, the wind speed ratio, and predetermined correlation data, and the like by executing predetermined programs for performing the above-described processes.

Figure 5:
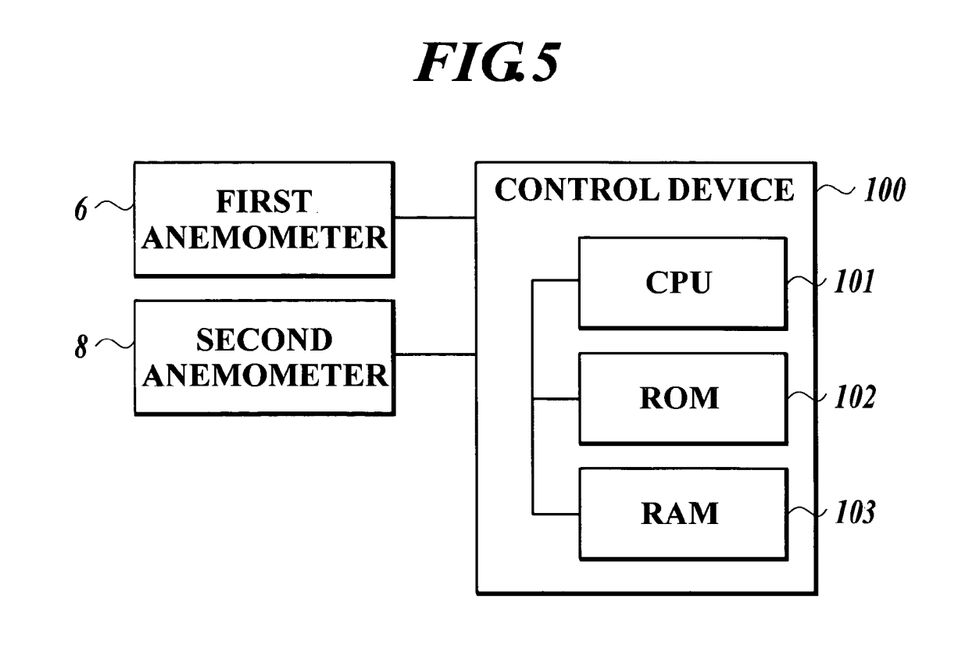
FIG. 5 is a block diagram for illustrating a control device of the horizontal axis wind turbine shown in FIG. 1.

The control device 100 comprises a CPU 101, a ROM 102, and a RAM 103 as shown in FIG. 5. The CPU 101 performs the calculating process, the upflow angle estimating process, and the like by the programs. The ROM 102 stores the programs and the correlation data showing the relationships between the wind speed difference and the upflow angle and between the wind speed ratio and the upflow angle (the after-described wind speed difference correlation data and wind speed ratio correlation data). The RAM 103 is used for temporary storing of results in each process and the like. The control device 100 is an upflow angle measuring section of the present invention. The control device 100 functions as an upflow angle measuring section comprising a wind speed difference calculating unit, a wind speed ratio calculating unit, a recording unit, and the upflow angle estimating unit of the present invention.

The relationship between values of the wind speed measured by the first anemometer 6 and the second anemometer 8 of the horizontal axis wind turbine 1 according to the present embodiment and the upflow angles will be described with FIGS. 3 and 4.

The horizontal plate 7 is disposed between the first anemometer 6 and the second anemometer 8 of the horizontal axis wind turbine 1. Therefore a difference is made between a value of the wind speed measured by the first anemometer 6 and a value of the wind speed measured by the second anemometer 8 when an upflow wind (or a downflow wind) blows.

Concretely speaking, when an upflow wind (a wind at the plus upflow angle) blows against the rotor 4, the wind speed measured by the second anemometer 8 becomes higher than the wind speed measured by the first anemometer 6 due to the effect of the horizontal plate 7 because the horizontal plate 7 is disposed over the second anemometer 8. Meanwhile when a downflow wind (a wind at the minus upflow angle) blows against the rotor 4, the wind speed measured by the second anemometer 8 becomes lower than the wind speed measured by the first anemometer 6 due to the effect of the horizontal plate 7.

Therefore a certain relationship is forged between: the difference between the wind speed measured by the first anemometer 6 and the wind speed measured by the second anemometer; and the upflow angle. In the present embodiment, the data relating the relationship between the wind speed difference and the upflow angle and the data relating the relationship between the wind speed ratio and the upflow angle are obtained such a ground-based experiment, as a wind tunnel experiment or the like, in advance.

Figure 3:
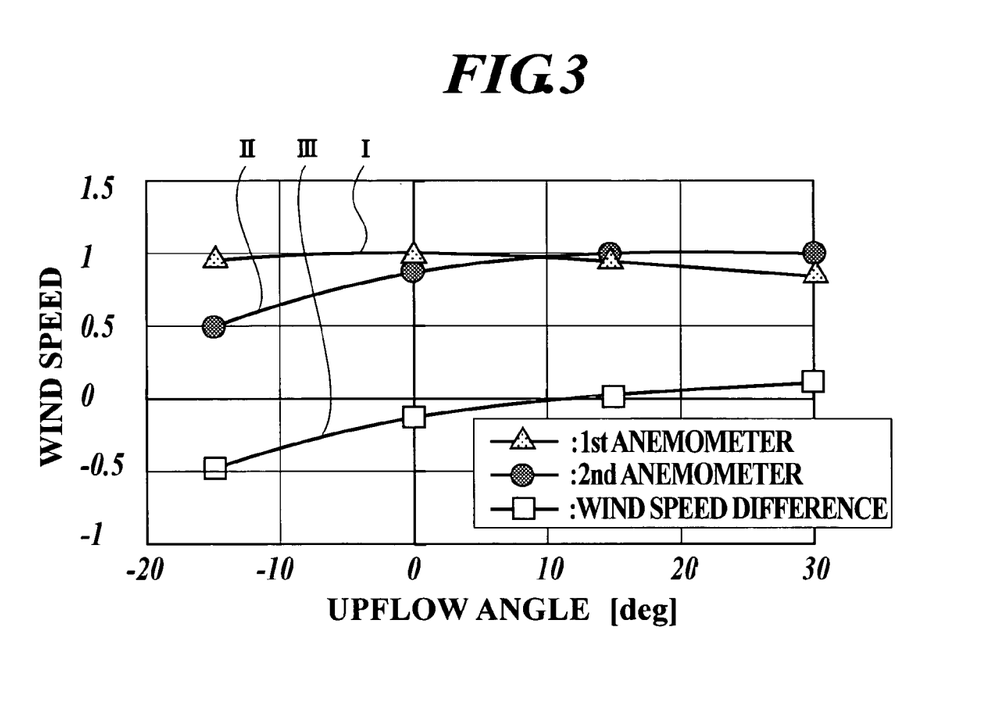
FIG. 3 is a figure showing correlation data of a wind speed difference (a graph showing relationship between a wind speed difference and an upflow angle) stored in a ROM of the horizontal axis wind turbine shown in FIG. 1.

The graph showing the relationship between the wind speed difference and the upflow angle in FIG. 3 may be adopted as the wind speed difference correlation data. The vertical axis is "wind speed", and the horizontal axis is "the upflow angle (degree)" in FIG. 3. Values of "wind speed" of the vertical axis in FIG. 3 are ratios (dimensionless values) of the measured values to the speed of an uniform flow in front of the wind turbine.

While the ratios between the speed of the uniform flow and measured values are used here, it is difficult to measure the speed of the uniform flow in an actual wind turbine. Therefore the measured value of the first anemometer 6 in the forward side may be used instead of the speed of the uniform flow. In this case, a curve I in the FIG. 3 becomes the line of "wind speed=1". In addition, a curve II and a curve III become curves wherein values of wind speed at the upflow angle of "0 degree" do not changed and values of wind speed except at the upflow angle of "0 degree" become higher than the values shown in FIG. 3.

The curve I in FIG. 3 is formed by plotting a point on a graph at a value of the wind speed measured by the first anemometer 6 in each case that the upflow angle is "−15 degree", "0 degree", "15 degree", and "30 degree" and by connecting these points with an approximating curve. The value of the wind speed measured by the first anemometer 6 is constant within the upflow angle of "−15 to 15 degree". Whereas the value of the wind speed measured by the first anemometer gradually diminishes with increase of the upflow angle, in the case of the upflow angle above "15 degree" (see FIG. 3). The reason is that the horizontal component of the wind speed diminishes with increase of the upflow angle.

The curve II in FIG. 3 is formed by plotting a point on a graph at a value of the wind speed measured by the second anemometer 8 in each case that the upflow angle is "−15 degree", "0 degree", "15 degree", and "30 degree" and by connecting these points with an approximating curve. The value of the wind speed measured by the second anemometer 8 is lower than the wind speed measured by the first anemometer 6 in the case of the minus upflow angle (that is, in the case of a downflow wind) (see FIG. 3). The reason is that a downflow wind is blocked by the horizontal plate 7. Whereas the value of the wind speed measured by the second anemometer 8 hardly diminishes in the case of the upflow angle above "15 degree". The reason is that an upflow wind is changed into a horizontal wind by the horizontal plate 7.

The curve III in FIG. 3 is formed by plotting a point on a graph at a value that is a value of the wind speed measured by the second anemometer 8 minus a value of the wind speed measured by the first anemometer 6 (a wind speed difference) in each case that the upflow angle is "−15 degree", "0 degree", "15 degree", and "30 degree" and by connecting these points with an approximating curve. Because a correlation is made between the wind speed difference and the upflow angle by the curve III, the upflow angle can be estimated using the curve III and the wind speed difference calculated from the wind speed measured by the first anemometer 6 and the second anemometer 8. For example, the upflow angle is estimated at "about 10 degree" in the case of the wind speed difference of "0 m/s" (see FIG. 3).

Figure 4:
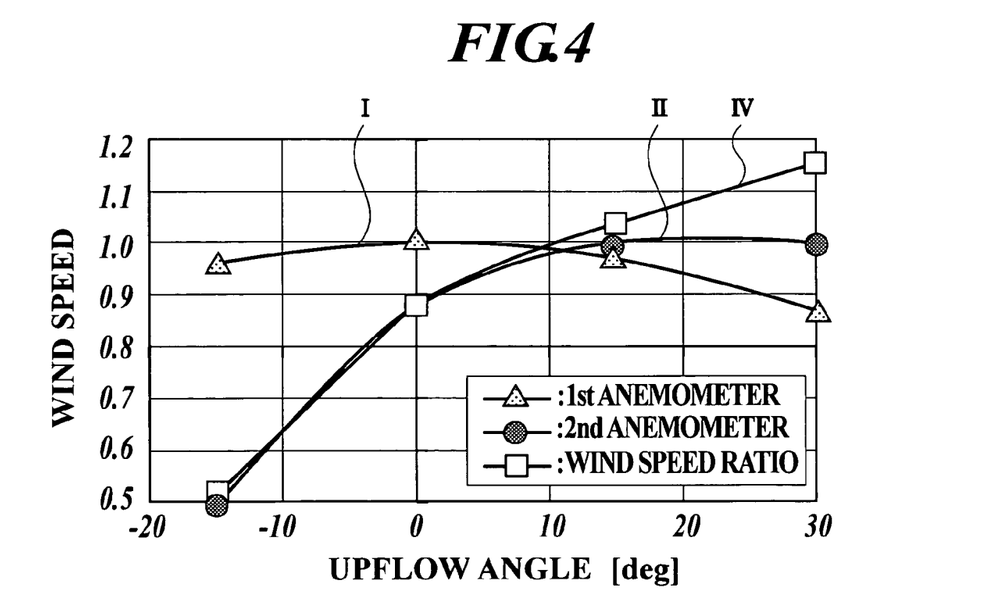
FIG. 4 is a figure showing correlation data of a wind speed ratio (a graph showing relationship between ratio of wind speeds and an upflow angle) stored in a ROM of the horizontal axis wind turbine shown in FIG. 1.

The graph showing the relationship between the wind speed ratio and the upflow angle in FIG. 4 may be adopted as the wind speed ratio correlation data. The vertical axis is "wind speed", and the horizontal axis is "the upflow angle (degree)" in FIG. 4. Values of "wind speed" of the vertical axis in FIG. 4 are ratios (dimensionless values) of the measured values to the speed of an uniform flow in front of the wind turbine. A curve I and a curve II in FIG. 4 are the same as the curve I and the curve II in FIG. 3 (only the scale of the vertical axis is changed).

The curve IV in FIG. 4 is formed by plotting a point on a graph at a value that is a value of the wind speed measured by the second anemometer 8 divided by a value of the wind speed measured by the first anemometer 6 (a wind speed ratio) in each case that the upflow angle is "−15 degree", "0 degree", "15 degree", and "30 degree" and by connecting these points with an approximating curve. Because a correlation is made between the wind speed ratio and the upflow angle by the curve IV, the upflow angle can be estimated using the curve IV and the wind speed ratio calculated from the wind speed measured by the first anemometer 6 and the second anemometer 8. For example, the upflow angle is estimated at "about 10 degree" in the case of the wind speed ratio of "1" (see FIG. 4).

Hereinafter a method for measuring an upflow angle by using the horizontal axis wind turbine 1 according to the present embodiment will be described.

First, a wind speed is measured by the first anemometer 6 attached upward to the peripheral part of the upwind side of the boom 5 (step for measuring the first wind speed). At the same time, a wind speed is measured by the second anemometer 8 attached downward to the lower portion of the boom 5 below the horizontal plate 7 (step for measuring the second wind speed). Subsequently the control device 100 of the horizontal axis wind turbine 1 calculates the difference (wind speed difference) between the wind speeds measured by the first anemometer 6 and the second anemometer 8 (step for calculating the wind speed difference). The control device 100 estimates the upflow angle by using the curve III of the graph (see FIG. 3) showing the relationship between the wind speed difference and the upflow angle recorded in the ROM 102 and the wind speed difference calculated in the step for calculating the wind speed difference (step for estimating the upflow angle).

As a substitute for the step for calculating the wind speed difference, the ratio (the wind speed ratio) between the wind speeds measured by the first anemometer 6 and the second anemometer 8 may be calculated (a step for calculating the wind speed ratio). In this case, the control device 100 estimates the upflow angle by using the curve IV of the graph (see FIG. 4) showing the relationship between the wind speed ratio and the upflow angle recorded in the ROM 102 and the wind speed ratio calculated in the step for calculating the wind speed ratio (a step for estimating the upflow angle).

In the horizontal axis wind turbine 1 according to the above-described embodiment, the horizontal plate 7 is disposed on the upwind side of the rotational central portion (hub) of the rotor 4. The first anemometer 6 is disposed at an upper position of the upwind side of the horizontal plate 7, where the horizontal plate 7 has a less effect, and the second anemometer 8 is disposed at a lower position of the horizontal plate 7.

Therefore when an upflow wind (a wind at the plus blowing angle) blows against the rotor 4, the wind speed measured by the second anemometer 8 becomes higher than the wind speed measured by the first anemometer 6 due to the effect of the horizontal plate 7 (see FIG. 3). Whereas when a downflow wind (a wind at the minus upflow angle) blows against the rotor 4, the wind speed measured by the second anemometer 8 becomes lower than the wind speed measured by the first anemometer 6 due to the effect of the horizontal plate 7 (see FIG. 3). Consequently a constant relationship exists between the difference (the wind speed difference) or the ratio (the wind speed ratio) between wind speeds measured by the first anemometer 6 and the second anemometer 8 and the upflow angle.

It is possible to measure (estimate) the upflow angle by the control device 100 based on the difference (or the ratio) between the wind speeds measured by the first anemometer 6 and the second anemometer 8 due to use of the relationship. Consequently the upflow angle can be continuously measured at low cost with high reliability without using an expensive apparatus.

Furthermore because of adoption of two anemometers (the first anemometer 6 and the second anemometer 8), when either anemometer breaks down, the other anemometer makes measurement of wind speed for control possible. In addition to ensuring redundancy of an anemometer and shortening the down time of a wind turbine, a loss of power production in the stopping time of a wind turbine can be reduced.

While an example wherein "rotation anemometers" are adopted as the first anemometer 6 and the second anemometer 8 is shown in the above-described embodiment, it is allowed to adopt "wind pressure anemometers", "hot wire anemometers", "ultrasonic anemometers", or the like.

As for the embodiment of the present invention, the first anemometer is disposed at an upper position of the upwind side of the horizontal plate and the second anemometer is disposed at a lower position of the horizontal plate. Instead, the first anemometer may be disposed at a lower position of the upwind side of the horizontal plate and the second anemometer may be disposed at an upper position of the horizontal plate.

In addition, as for the embodiment of the present invention, the wind speed difference or ratio may be replaced by a value calculated from the wind speeds by such a suitable function as a logarithmic function or a suitable combination of functions.

The entire disclosure of Japanese Patent Applications No. Tokugan 2003-291540 filed on Aug. 11, 2003 including specification, claims, drawings and summary are incorporated herein by reference in its entirety.

What is claimed is:

1. A horizontal axis wind turbine comprising:
   a horizontal plate disposed on upwind side of a rotational central portion of a rotor;
   a first anemometer disposed at an upper position of upwind side of the horizontal plate;
   a second anemometer disposed at a lower position of the horizontal plate; and
   an upflow angle measuring section for measuring an upflow angle based on one of a wind speed difference and a wind speed ratio obtained from wind speeds measured by the first anemometer and the second anemometer.

2. The wind turbine as claimed in claim 1, wherein the upflow angle measuring section comprises:
   a wind speed difference calculating unit for calculating the wind speed difference from the wind speeds measured by the first anemometer and the second anemometer;
   a recording unit for recording wind speed difference correlation data showing relationship between the wind speed difference and the upflow angle; and
   an upflow angle estimating unit for estimating the upflow angle by using the wind speed difference calculated by the wind speed difference calculating unit and the wind speed difference correlation data recorded in the recording unit.

3. The wind turbine as claimed in claim 1, wherein the upflow angle measuring section comprises:
   a wind speed ratio calculating unit for calculating the wind speed ratio from the wind speeds measured by the first anemometer and the second anemometer;
   a recording unit for recording wind speed ratio correlation data showing relationship between the wind speed ratio and the upflow angle; and
   an upflow angle estimating unit for estimating the upflow angle by using the wind speed ratio calculated by the wind speed ratio calculating unit and the wind speed ratio correlation data recorded in the recording unit.

4. An upflow angle measuring method using the wind turbine as claimed in claim 1, the method comprising:
   measuring a first wind speed measured by the first anemometer;
   measuring a second wind speed measured by the second anemometer;
   calculating the wind speed difference from the first wind speed measured in the measuring of the first wind speed and the second wind speed measured in the measuring of the second wind speed; and
   estimating the upflow angle by using the data showing relationship between the wind speed difference and the upflow angle and the wind speed difference calculated in the calculating.

5. An upflow angle measuring method using the wind turbine as claimed in claim 2, the method comprising:
   measuring a first wind speed measured by the first anemometer;
   measuring a second wind speed measured by the second anemometer;
   calculating the wind speed difference from the first wind speed measured in the measuring of the first wind speed and the second wind speed measured in the measuring of the second wind speed; and
   estimating the upflow angle by using the data showing relationship between the wind speed difference and the upflow angle and the wind speed difference calculated in the calculating.

6. An upflow angle measuring method using the wind turbine as claimed in claim 1, the method comprising:
   measuring a first wind speed measured by the first anemometer;
   measuring a second wind speed measured by the second anemometer;
   calculating the wind speed ratio from the first wind speed measured in the measuring of the first wind speed and the second wind speed measured in the measuring of the second wind speed; and
   estimating the upflow angle by using the data showing relationship between the wind speed ratio and the upflow angle and the wind speed ratio calculated in the calculating.

7. An upflow angle measuring method using the wind turbine as claimed in claim 3, the method comprising:
   measuring a first wind speed measured by the first anemometer;
   measuring a second wind speed measured by the second anemometer;
   calculating the wind speed ratio from the first wind speed measured in the measuring of the first wind speed and the second wind speed measured in the measuring of the second wind speed; and
   estimating the upflow angle by using the data showing relationship between the wind speed ratio and the upflow angle and the wind speed ratio calculated in the calculating.

8. A horizontal axis wind turbine comprising:
   a parting member disposed in a horizontal position;
   a first anemometer disposed on upwind side of the parting member;
   a second anemometer disposed at a lower position of the parting member; and
   an upflow angle measuring section for measuring an upflow angle based on wind speeds measured by the first anemometer and the second anemometer, wherein one of the two anemometers is located above level of the parting member and the other is located below the level of the parting member.

9. The wind turbine as claimed in claim 8, wherein the parting member is a plate-like member.

10. The wind turbine as claimed in claim 8, wherein the upflow angle measuring section measures an upflow angle based on a difference or a ratio between wind speeds measured by the first anemometer and the second anemometer.

11. The wind turbine as claimed in claim 8, wherein the upflow angle measuring section comprising;
 a wind speed difference calculating unit for calculating a wind speed difference from the wind speeds measured by the first anemometer and the second anemometer;
 a recording unit for recording wind speed difference correlation data showing relationship between the wind speed difference and the upflow angle; and
 an upflow angle estimating unit for estimating the upflow angle by using the wind speed difference calculated by the wind speed difference calculating unit and the wind speed difference correlation data recorded in the recording unit.

12. The wind turbine as claimed in claim 8, wherein the upflow angle measuring section comprises:
 a wind speed ratio calculating unit for calculating a wind speed ratio from the wind speeds measured by the first anemometer and the second anemometer;
 a recording unit for recording wind speed ratio correlation data showing relationship between the wind speed ratio and the upflow angle; and
 an upflow angle estimating unit for estimating the upflow angle by using the wind speed ratio calculated by the wind speed ratio calculating unit and the wind speed ratio correlation data recorded in the recording unit.

13. An upflow angle measuring method using the wind turbine as claimed in claim 8, the method comprising:
 measuring a first wind speed measured by the first anemometer;
 measuring a second wind speed measured by the second anemometer;
 calculating a wind speed difference from the first wind speed measured in the measuring of the first wind speed and the second wind speed measured in the measuring of the second wind speed; and
 estimating the upflow angle by using the data showing relationship between the wind speed difference and the upflow angle and the wind speed difference calculated in the calculating.

14. An upflow angle measuring method using the wind turbine as claimed in claim 8, the method comprising:
 measuring a first wind speed measured by the first anemometer;
 measuring a second wind speed measured by the second anemometer;
 calculating a wind speed ratio from the first wind speed measured in the measuring of the first wind speed and the second wind speed measured in the measuring of the second wind speed; and
 estimating the upflow angle by using the data showing relationship between the wind speed ratio and the upflow angle and the wind speed ratio calculated in the calculating.

* * * * *